(12) United States Patent
Matsuda et al.

(10) Patent No.: US 7,036,940 B2
(45) Date of Patent: May 2, 2006

(54) IMAGE PROCESSING SYSTEM, PROJECTOR, PORTABLE DEVICE, AND IMAGE PROCESSING METHOD

(75) Inventors: Hideki Matsuda, Fujimi-machi (JP); Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 58 days.

(21) Appl. No.: 10/687,808

(22) Filed: Oct. 20, 2003

(65) Prior Publication Data
US 2004/0156024 A1  Aug. 12, 2004

(30) Foreign Application Priority Data
Dec. 4, 2002 (JP) .............................. 2002-352247

(51) Int. Cl.
G03B 21/00 (2006.01)
G03B 21/14 (2006.01)
G06K 9/00 (2006.01)
G04N 3/23 (2006.01)

(52) U.S. Cl. ......................... 353/70; 348/746; 382/171
(58) Field of Classification Search ................ 353/69, 353/70; 382/171, 172; 348/745, 746
See application file for complete search history.

(56) References Cited

U.S. PATENT DOCUMENTS

| | | | |
|---|---|---|---|
| 5,612,736 A | 3/1997 | Vogeley et al. | |
| 6,222,593 B1 | 4/2001 | Higurashi et al. | 348/745 |
| 6,305,805 B1 * | 10/2001 | Liebenow | 353/69 |
| 6,483,537 B1 * | 11/2002 | Mayer et al. | 348/745 |
| 6,520,647 B1 * | 2/2003 | Raskar | 353/70 |
| 6,618,076 B1 * | 9/2003 | Sukthankar et al. | 348/745 |
| 6,733,138 B1 * | 5/2004 | Raskar | 353/70 |
| 6,846,081 B1 * | 1/2005 | Mochizuki et al. | 353/70 |
| 2002/0051095 A1 | 5/2002 | Su | 348/745 |

FOREIGN PATENT DOCUMENTS

| | | |
|---|---|---|
| DE | 197 19 828 A1 | 11/1998 |
| JP | A 4-355740 | 12/1992 |
| JP | A 5-30520 | 2/1993 |
| JP | A 6-269014 | 9/1994 |
| JP | A 8-9309 | 1/1996 |
| JP | A-08-009309 | 1/1996 |
| JP | A 8-271852 | 10/1996 |
| JP | A-09-326981 | 12/1997 |
| JP | A 10-93984 | 4/1998 |

(Continued)

OTHER PUBLICATIONS

Sukthankar R. et al.; "Automatic Keystone Correction for Camera-Assisted Presentation Interfaces;" Lecture Notes in Computer Science, Springer Verlag, New York, NY, U.S.A., Oct. 12, 2000; pp. 607-614.

*Primary Examiner*—Christopher Mahoney
(74) *Attorney, Agent, or Firm*—Oliff & Berridge, PLC

(57) ABSTRACT

In order to provide an image processing system, a projector, a portable device, and an image processing method that enable the correction of keystone distortion in the horizontal direction automatically and also appropriately, a remote controller operated by the viewer is provided with a projection area imaging function and a direction determination function; a receiver section is used to receive imaging information and direction information; a horizontal keystone distortion correction section is used to select a keystone distortion correction value from a 3D-LUT containing keystone distortion correction values, based on the imaging information and direction information; and a resizing section is used to correct the keystone distortion.

19 Claims, 11 Drawing Sheets

FOREIGN PATENT DOCUMENTS

| | | |
|---|---|---|
| JP | A 10-200836 | 7/1998 |
| JP | A-2000-081593 | 3/2000 |
| JP | A 2000-81593 | 3/2000 |
| JP | A 2000-241874 | 9/2000 |
| JP | A 2001-61121 | 3/2001 |
| JP | A 2001-83949 | 3/2001 |
| JP | A-2001-083949 | 3/2001 |
| JP | A 2002-112148 | 4/2002 |
| JP | A 2002-247614 | 8/2002 |
| JP | A 2003-5277 | 1/2003 |
| JP | A 2003-18503 | 1/2003 |
| WO | WO 99/14716 | 3/1999 |

* cited by examiner

IMAGE PROCESSING SYSTEM, PROJECTOR, PORTABLE DEVICE, AND IMAGE PROCESSING METHOD

Japanese Patent Application No. 2002-352247, filed on Dec. 4, 2002, is hereby incorporated by reference in its entirety.

BACKGROUND OF THE INVENTION

The present invention relates to an image processing system, a projector, a portable device, and an image processing method that are capable of correcting keystone distortion.

Various different methods have been proposed for correcting keystone distortion that is generated in images projected by a projector.

One method detects the inclination of the projector and automatically corrects keystone distortion in the vertical direction, by way of example.

However, this method does not enable the user to correct keystone distortion in the horizontal direction.

For that reason, one method of correcting keystone distortion in the horizontal direction involves the user correcting the keystone distortion manually by pressing a correction switch on a remote controller while viewing the image.

However, the manual correction of the keystone distortion is troublesome to the user, making it difficult to perform suitable correction manually.

In the light of the above problem, methods have been proposed for correcting image distortion automatically, such as that disclosed in Japanese Patent Application No. 2001-036086 (Japanese Patent Publication No. 2002-112148).

However, this method only discloses a method of correcting keystone distortion by detecting the distance up to the installation plane of the projector and the inclinations in the horizontal and vertical directions with respect to the horizontal plane of the projector.

For that reason, that method is based on the premise that the projection screen is positioned facing the projector, as stated in that application.

If the projector is positioned in a direction at an angle to the projection screen, however, keystone distortion is generated in the horizontal direction (sideways direction).

It is therefore difficult to use that published method to correct keystone distortion in the horizontal direction both automatically and appropriately.

BRIEF SUMMARY OF THE INVENTION

The present invention was devised in the light of the above-described technical problems, and may provide an image processing system, a projector, a portable device, and an image processing method that make it possible to correct keystone distortion, particularly keystone distortion in the horizontal direction, both automatically and appropriately.

In order to resolve the above-described technical problems, according to a first aspect of the present invention, there is provided an image processing system comprising:

sensing means for sensing a projection area on which an image is projected and outputting sensing information;

histogram generation means for generating histogram information that expresses histograms of the numbers of pixels of the sensed image in each of the vertical and horizontal directions, based on the sensing information;

direction determination means for generating direction information, based on an angle between a normal direction orthogonal to the projection area from a sensing position and a projected image direction toward a central portion of the projected image from the sensing position; and keystone distortion correction means for correcting keystone distortion of the projected image, based on the histogram information and the direction information.

According to a second aspect of the present invention, there is provided an image processing system comprising:

a sensing section which senses a projection area on which an image is projected and outputting sensing information;

a histogram generation section which generates histogram information that expresses histograms of the numbers of pixels of the sensed image in each of the vertical and horizontal directions, based on the sensing information;

a direction determination section which generates direction information, based on an angle between a normal direction orthogonal to the projection area from a sensing position and a projected image direction toward a central portion of the projected image from the sensing position; and a keystone distortion correction section which corrects keystone distortion of the projected image, based on the histogram information and the direction information.

According to a third aspect of the present invention, there is provided a projector comprising:

projection means for projecting an image;

receiving means for receiving histogram information that expresses histograms of the numbers of pixels of the sensed image in each of the vertical and horizontal directions, based on sensing information obtained by sensing a projection area on which the projected image is projected, and direction information based on an angle between a normal direction orthogonal to a projection area from a sensing position and a projected image direction toward a central portion of the projected image from the sensing position; and keystone distortion correction means for correcting keystone distortion of the projected image, based on the histogram information and the direction information.

According to a fourth aspect of the present invention, there is provided a projector comprising:

a projection section which projects an image;

a receiver section which receives histogram information that expresses histograms of the numbers of pixels of the sensed image in each of the vertical and horizontal directions, based on sensing information obtained by sensing a projection area on which the projected image is projected, and direction information based on an angle between a normal direction orthogonal to a projection area from a sensing position and a projected image direction toward a central portion of the projected image from the sensing position; and a keystone distortion correction section which corrects keystone distortion of the projected image, based on the histogram information and the direction information.

According to a fifth aspect of the present invention, there is provided a portable device comprising:

sensing means for sensing a projection area on which an image is projected;

histogram generation means for generating histogram information that expresses histograms of the numbers of pixels of the sensed image in each of the vertical and horizontal directions, based on sensing information obtained by the sensing means;

direction determination means for determining direction information based on an angle between a normal direction orthogonal to the projection area from a sensing position and a projected image direction toward a central portion of the projected image from the sensing position; and transmitter means for correcting keystone distortion of the projected image, based on the histogram information and the direction information, and transmitting the histogram information and the direction information to an image display device that projects the projected image.

According to a sixth aspect of the present invention, there is provided a portable device comprising:

a sensing section which senses a projection area on which an image is projected;

a histogram generation section for generating histogram information that expresses histograms of the numbers of pixels of the sensed image in each of the vertical and horizontal directions, based on sensing information obtained by the sensing section;

a direction determination section which determines direction information based on an angle between a normal direction orthogonal to the projection area from a sensing position and a projected image direction toward a central portion of the projected image from the sensing position; and a transmitter section which corrects keystone distortion of the projected image, based on the histogram information and the direction information, and transmitting the histogram information and the direction information to an image display device that projects the projected image.

According to a seventh aspect of the present invention, there is provided an image processing method comprising:

sensing a projection area on which an image is projected and outputting sensing information;

generating histogram information that expresses histograms of the numbers of pixels of the sensed image in each of the vertical and horizontal directions, based on the sensing information;

detecting a normal direction orthogonal to the projection area from a sensing position;

detecting a projected image direction toward a central portion of the projected image from the sensing position;

generating direction information, based on an angle between the normal direction and the projected image direction; and correcting keystone distortion of the projected image, based on the histogram information and the direction information.

The image processing system and others according to the present invention makes it possible to determine keystone distortion by sensing. They can convert the magnitude of the distortion into numerical values by converting the sensing information into histograms. They can also determine the relative displacement between the sensing direction and the projection direction by determining the angle.

Furthermore, the image processing system and others can correct not only keystone distortion in the vertical direction but also keystone distortion in the horizontal direction, both automatically and appropriately, by correcting the keystone distortion, based on histogram information that expresses the distortion and direction information that expresses relative displacement between the sensing direction and the projection direction.

The image processing system may comprise:

a portable device having the sensing means, the histogram generation means, and the direction determination means; and an image display device having the keystone distortion correction means and projection means for projecting an image, wherein the keystone distortion correction means may include:

vertical keystone distortion correction means having inclination detection means for detecting the inclination of the image display device, for correcting keystone distortion in the vertical direction; and horizontal keystone distortion correction means for correcting keystone distortion in the horizontal direction, based on the histogram information and the direction information.

In the projector, the keystone distortion correction means may include:

vertical keystone distortion correction means having inclination detection means for detecting the inclination of the projection means, for correcting keystone distortion in the vertical direction; and horizontal keystone distortion correction means for correcting keystone distortion in the horizontal direction, based on the histogram information and the direction information.

The image processing method may comprise:

detecting inclination of an image display device;

correcting keystone distortion in the vertical direction, based on the detected inclination; and correcting keystone distortion in the horizontal direction, based on the histogram information and the direction information.

The keystone distortion in the horizontal direction is affected by the relative positional relationship between the image display device and the projection area. In contrast thereto, the keystone distortion in the vertical direction is mainly affected by the inclination of the image display device.

The image processing system and others can therefore correct the keystone distortion as appropriate, by correcting the keystone distortion in the vertical direction, based on the inclination of the image display device, and by correcting the keystone distortion in the horizontal direction, based on histogram information and direction information that reflect the position of the projection area.

According to an eighth aspect of the present invention, there is provided an image processing system comprising:

light projection means for projecting light of a distortion-free and predetermined shape into a projection area;

sensing means for outputting sensing information obtained by sensing the projection area into which the light of the predetermined shape is projected, from a projection position of a projection section for projecting an image;

area extraction means for extracting coordinates of the light of the predetermined shape in a sensed area, based on the sensing information; and keystone distortion correction means for converting the coordinates of the light of the predetermined shape in the sensed area into coordinates for projection in a spatial light modulator of the projection section, and correcting keystone distortion by mapping coordinates of an input image into the projection coordinates.

According to a ninth aspect of the present invention, there is provided an image processing system comprising:

a light projection section which projects light of a distortion-free and predetermined shape into a projection area;

a sensing section which outputs sensing information obtained by sensing the projection area into which the light of the predetermined shape is projected, from a projection position of a projection section for projecting an image;

an area extraction section which extracts coordinates of the light of the predetermined shape in a sensed area, based on the sensing information; and a keystone distortion correction section which converts the coordinates of the light of the predetermined shape in the sensed area into coordinates for projection in a spatial light modulator of the projection section, and correcting keystone distortion by mapping coordinates of an input image into the projection coordinates.

The image processing system may comprise:

a portable device having the light projection means; and an image display device having the sensing means, the keystone distortion correction means, and the projection section.

According to a tenth aspect of the present invention, there is provided a projector comprising:

sensing means for outputting sensing information obtained by sensing a projection area into which light of a distortion-free and predetermined shape is projected, from a projection position of a projection section for projecting an image;

area extraction means for extracting coordinates of the light of the predetermined shape in a sensed area, based on the sensing information;

keystone distortion correction means for converting the coordinates of the light of the predetermined shape in the sensed area into coordinates for projection in a spatial light modulator of the projection section, and correcting keystone distortion by mapping coordinates of an input image into the projection coordinates; and the projection section.

According to an eleventh aspect of the present invention, there is provided a projector comprising:

a sensing section which outputs sensing information obtained by sensing a projection area into which light of a distortion-free and predetermined shape is projected, from a projection position of a projection section for projecting an image;

an area extraction section which extracts coordinates of the light of the predetermined shape in a sensed area, based on the sensing information;

a keystone distortion correction section which converts the coordinates of the light of the predetermined shape in the sensed area into coordinates for projection in a spatial light modulator of the projection section, and correcting keystone distortion by mapping coordinates of an input image into the projection coordinates; and the projection section.

According to a twelfth aspect of the present invention, there is provided an image processing method comprising:

projecting light of a distortion-free and predetermined shape into a projection area;

outputting sensing information obtained by sensing the projection area into which the light of the predetermined shape is projected, from a projection position of a projection section for projecting an image;

extracting coordinates of the light of the predetermined shape in a sensed area, based on the sensing information; and converting the coordinates of the light of the predetermined shape in the sensed area into coordinates for projection in a spatial light modulator of the projection section, and correcting keystone distortion by mapping coordinates of an input image into the in the sensed area projection coordinates.

The image processing system and others according to the present invention makes it possible to determine coordinates of light of a distortion-free and predetermined shape that is projected into a projection area by sensing.

In other words, the coordinates of the light of the predetermined shape can be taken as coordinates of a distortion-free image, and thus a distortion-free image can be projected during image projection by mapping the coordinates of an input image into those coordinates.

This makes it possible to correct keystone distortion in the horizontal direction both automatically and appropriately.

In the image processing system and the projector, the predetermined shape may be rectangular or square;

the area extraction means may extract coordinates of four corners of the light of the predetermined shape; and the keystone distortion correction means may convert the coordinates of the four corners of the light of the predetermined shape in the sensed area into coordinates for projection in a spatial light modulator of the projection section, and correct keystone distortion by mapping the coordinates of an input image into an area formed by the projection coordinates of the four corners.

In the image processing method, the predetermined shape may be rectangular or square; and the method may include:

extracting coordinates of four corners of the light of the predetermined shape when coordinates of the light of the predetermined shape in the sensed area are extracted; and converting the coordinates of the four corners of the light of the predetermined shape in the sensed area into coordinates for projection in the spatial light modulator of the projection section, and correcting keystone distortion by mapping coordinates of an input image into an area formed by the projection coordinates of the four corners, when the keystone distortion is corrected.

This makes it possible for the image processing system and others to display an image of a rectangular or square shape during the display of an input image, by projecting light having a rectangular or square shape, converting coordinates of the four corners of that rectangle or square into four coordinates for projection in a spatial light modulator (such as a liquid crystal light valve), and mapping the coordinates of an input image into an area formed by the four coordinates for projection.

This enables the image processing system and others to correct keystone distortion both automatic ally and appropriately.

DETAILED DESCRIPTION OF THE EMBODIMENTS

The present invention is described below, taking as an example the application thereof to an image processing system that correct keystone distortion of a projected image by using a projector that is an image display device and a remote controller that is a portable device, with reference to the accompanying figures. Note that the embodiments described below do not in any way limit the scope of the present invention as laid out in the claims herein. In addition, the entirety of the configuration described with reference to these embodiments is not limited to being essential structural components of the present invention.

The description below concerns a first embodiment in which a remote controller having a sensing means is used to sense a projection area and determine a direction, and a projector corrects keystone distortion. It also concerns a second embodiment in which a remote controller having a light projection means projects a rectangular laser beam into a projection area, and a projector corrects keystone distortion by sensing the projection area from the projection position.

First Embodiment

Figure 1:
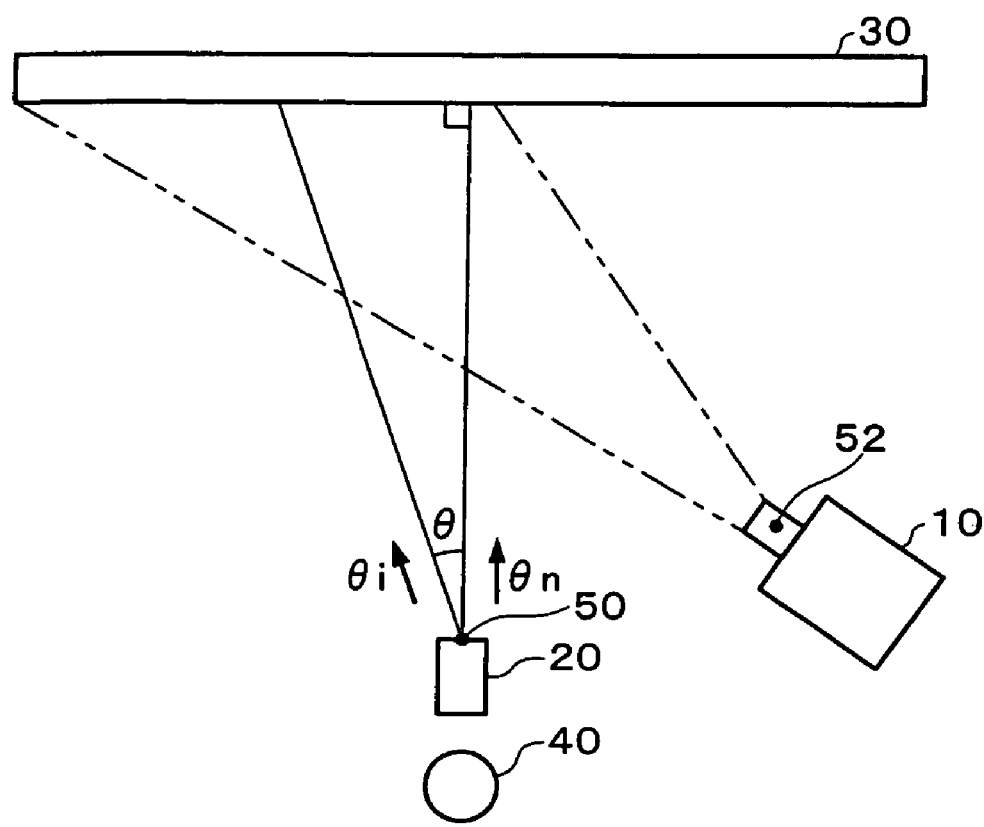
FIG. 1 is an overall conceptual view of an image processing system in accordance with a first embodiment of the present invention.

An overall conceptual view of an image processing system in accordance with the first embodiment is shown in FIG. 1. A schematic view of a projected image 70 and histograms in accordance with the first embodiment are shown in FIG. 2.

In the first embodiment, a projector 10 that is a type of image display device projects an image from a position which is not directly in front of a projection area 30, but directed forward and to the left from a state directly facing the projection area 30, and which is also at a distance further to the right than a viewer 40 who is a user.

Figure 2:
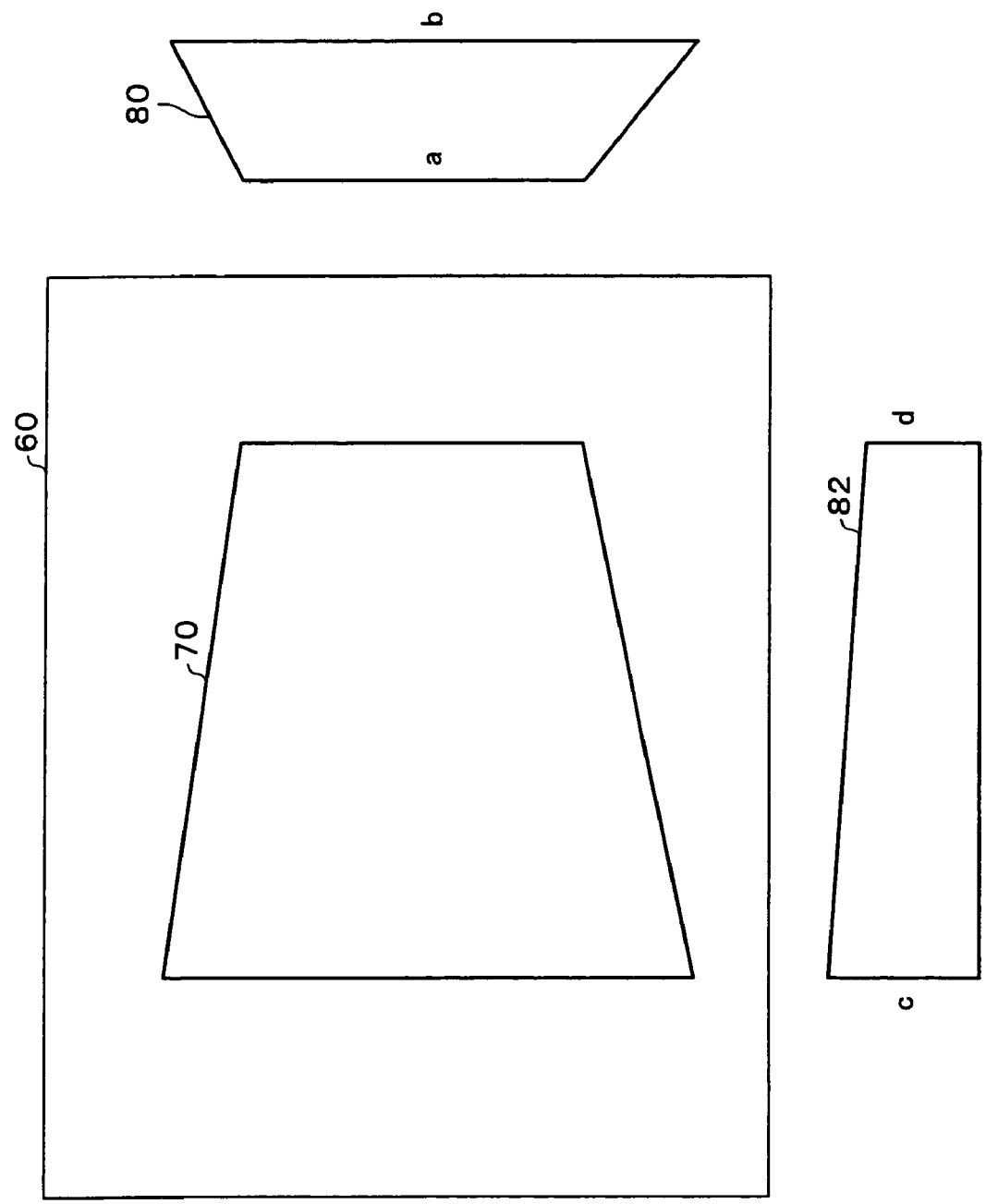
FIG. 2 is a schematic view of a projected image and histograms in accordance with the first embodiment of the present invention.

In such a case, the projected image 70 that the viewer 40 sees has a trapezoidal shape such that the leftmost edge is the longest and the rightmost edge is the shortest, as shown in FIG. 2.

With this embodiment, an imaging function is provided in a remote controller 20 that is a type of portable device manipulated by the viewer 40, enabling the remote controller 20 to sense (form an image of) the projection area 30.

The remote controller 20 is also provided with a histogram processing function, enabling the remote controller 20 to generate a histogram 80 of the numbers of pixels in the horizontal direction and a histogram 82 of the numbers of pixels in the vertical direction, for the projected image 70 in a captured image 60.

The remote controller 20 is further provided with a direction determination function, enabling the remote controller 20 to generate direction information based on an angle θ between a normal direction θn for the orthogonal direction from a virtual viewpoint position 50 to the projection area 30 and a projected image direction θi from the virtual viewpoint position 50 to a central portion of the projected image.

Note that the virtual viewpoint position 50 is a position that sets the viewpoint of the viewer 40 in a virtual manner, by way of example. In the first embodiment, the sensing position of the remote controller 20 becomes the virtual viewpoint position 50.

The projector 10 also has a keystone distortion correction function that corrects any keystone distortion of the projected image 70, based on the histogram information (the histogram 80 of the numbers of pixels in the horizontal direction and the histogram 82 of the numbers of pixels in the vertical direction) and the direction information.

The image processing system of this embodiment uses these functions to correct any keystone distortion of the projected image 70 from consideration of the virtual viewpoint position 50, both automatically and appropriately.

The description now turns to the functional blocks of the projector 10 for implementing these functions.

Figure 3:
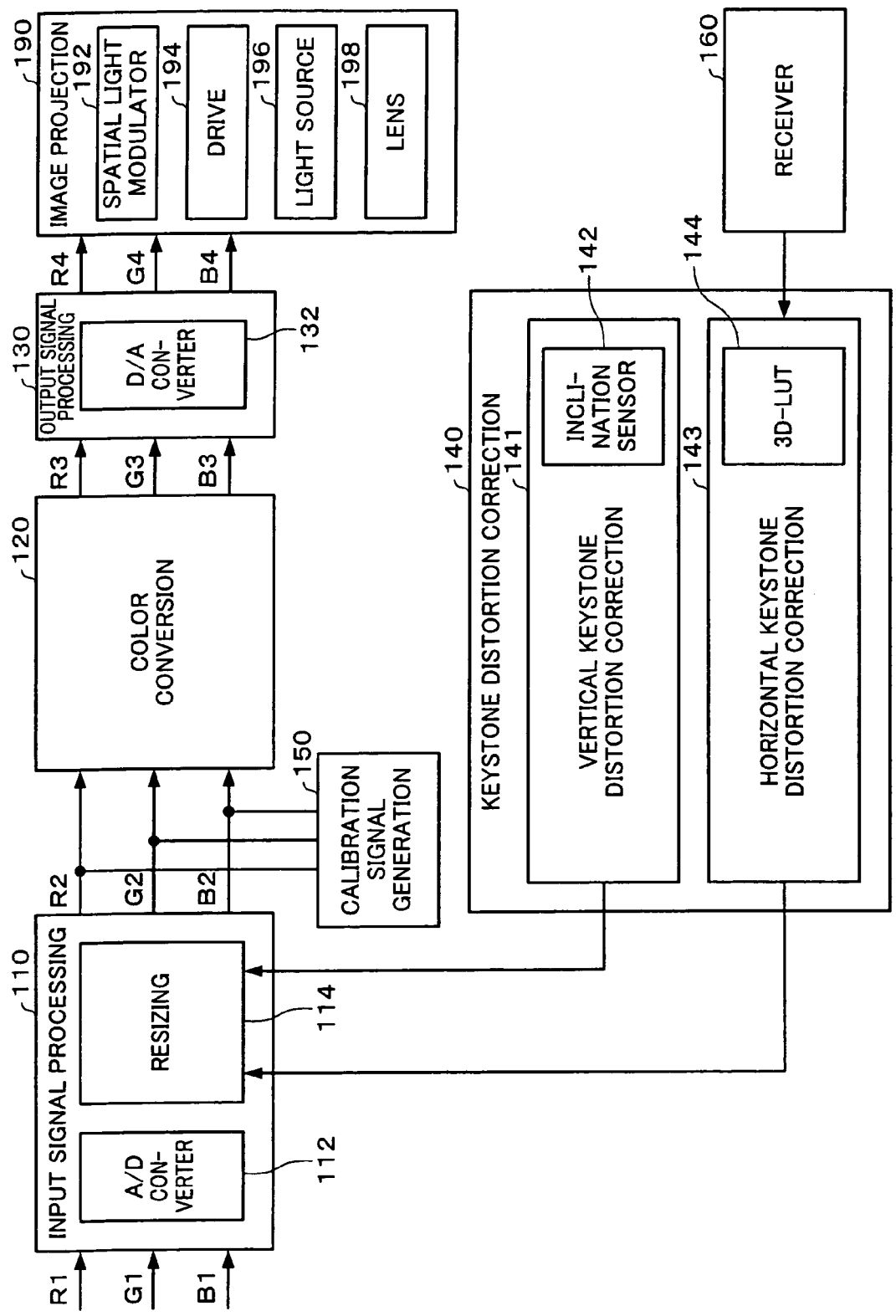
FIG. 3 is a functional block diagram of a projector in accordance with the first embodiment of the present invention.

A functional block diagram of the projector 10 in accordance with this embodiment is shown in FIG. 3.

The projector 10 comprises an input signal processing section 110, a color conversion section 120, an output signal processing section 130, an image projection section 190, a keystone distortion correction section 140, and a receiver section 160.

The input signal processing section 110 converts an R1 signal, a G1 signal, and a B1 signal (which form RGB signals in analog form that is a type of input image information that is input from a personal computer (PC) or the like) into an R2 signal, a G2 signal, and a B2 signal in digital form.

The input signal processing section 110 comprises an A/D converter section 112 that performs this analog-to-digital conversion and a resizing section 114 that functions as part of a keystone distortion correction means to adjust the position and dimensions of the projected image 70 by adjusting the input image signal.

A calibration signal generation section 150 generates an R2 signal, a G2 signal, and a B2 signal in digital format that are used for displaying a calibration image.

Generating the calibration signals within the liquid-crystal projector in this manner makes it possible for the liquid-crystal projector itself to perform the calibration, without having to input calibration signals to the liquid-crystal projector from an external input device such as a PC. Note that the configuration could also be such that the calibration signal generation section 150 is not provided and the calibration image signals are input from a PC or the like.

The color conversion section 120 outputs an R3 signal, a G3 signal, and a B3 signal having a color temperature that has been corrected on the basis of a standard setting for the liquid-crystal projector, based on the R2 signal, G2 signal, and B2 signal from the input signal processing section 110 or the calibration signal generation section 150.

The output signal processing section 130 comprises a D/A converter section 132. The D/A converter section 132 converts the R3 signal, G3 signal, and B3 signal from the color conversion section 120 into an R4 signal, a G4 signal, and a B4 signal in analog format.

Note that the A/D converter section 112 and the D/A converter section 132 are not necessary if the projector 10 uses only RGB signals in digital format.

The image projection section 190 that functions as projection means comprises a spatial light modulator 192, a drive section 194 for driving the spatial light modulator 192, a light source 196, and a lens 198.

The drive section 194 drives the spatial light modulator 192, based on the R4 signal, G4 signal, and B4 signal from the output signal processing section 130. The image projection section 190 projects light from the light source 196 through the spatial light modulator 192 and the lens 198.

The receiver section 160 receives histogram information and direction information that is transmitted from the remote controller 20.

The keystone distortion correction section 140 comprises a vertical keystone distortion correction section 141, which has an inclination sensor 142 and which corrects keystone distortion in the vertical direction, and a horizontal keystone distortion correction section 143, which has a 3D-LUT 144 and which corrects keystone distortion in the horizontal direction.

The inclination sensor 142 detects any inclination in the vertical direction of the projector 10, and the vertical keystone distortion correction section 141 transmits a vertical keystone distortion correction value that corresponds to that inclination (such as an integer value from −n to n, similar to that for manual adjustment) to the resizing section 114.

The horizontal keystone distortion correction section 143 takes the histogram information and direction information that has been received by the receiver section 160, selects a horizontal direction keystone distortion correction stored in the 3D-LUT 144 corresponding thereto (such as an integer value from −n to n, similar to that for manual adjustment), and transmits the thus-selected horizontal direction keystone distortion correction value to the resizing section 114.

The description now turns to the functional blocks for implementing the functions of the remote controller 20.

Figure 4:
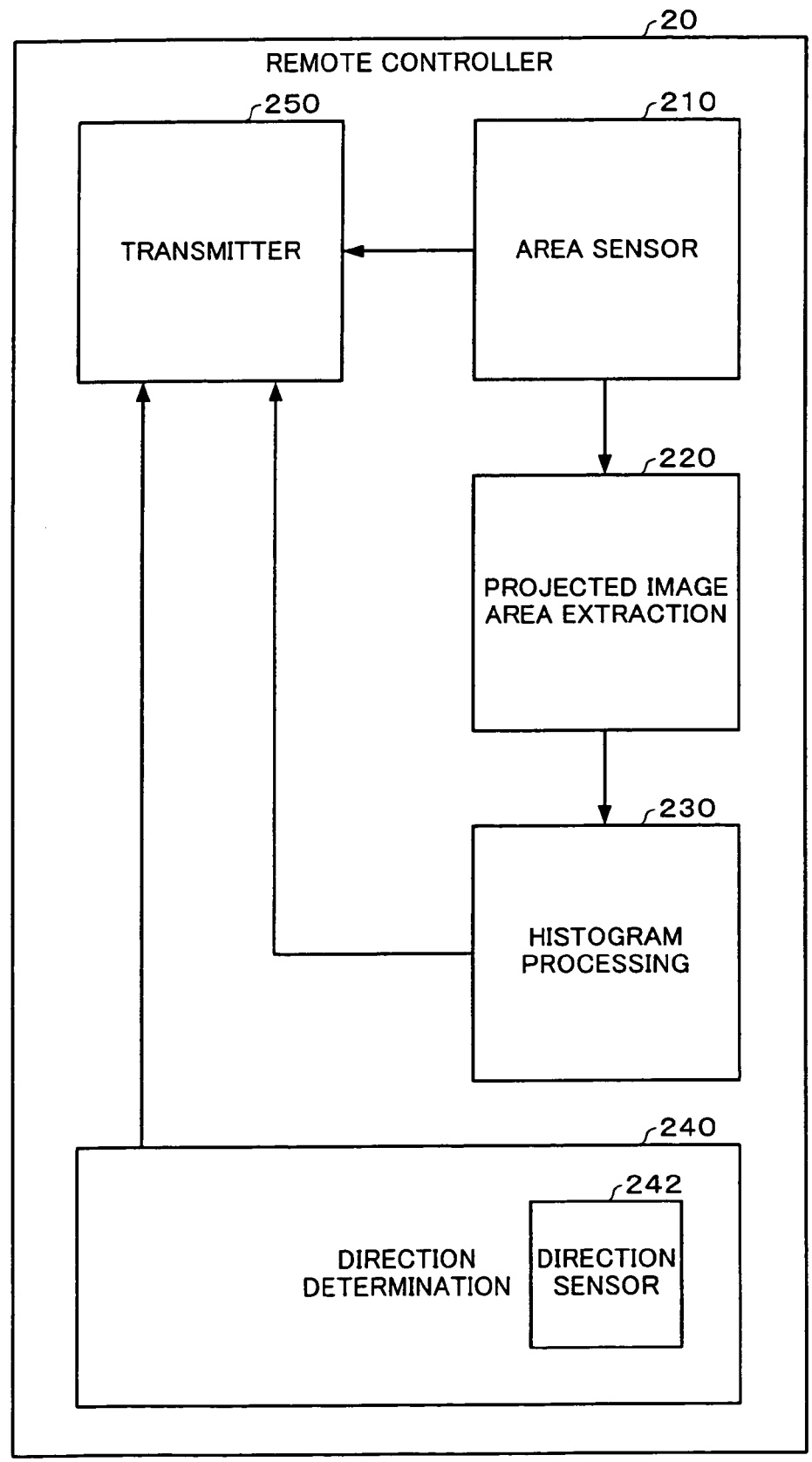
FIG. 4 is a functional block diagram of a remote controller in accordance with the first embodiment of the present invention.

A functional block diagram of the remote controller 20 in accordance with this embodiment is shown in FIG. 4.

The remote controller 20 comprises an area sensor section 210 that functions as sensing means to obtain the captured image 60 by using a sensor such as a CCD sensor to image the projection area 30, a projected image area extraction section 220 that extracts the projected image 70 from the captured image 60, and a histogram processing section 230 that functions as histogram generation means for generating the histogram 80 of the numbers of pixels in the horizontal direction and the histogram 82 of the numbers of pixels in the vertical direction of the projected image 70.

The projected image area extraction section 220 extracts a brightness detection area of pixels of a maximum brightness, such as those of greater than 65% or 80% brightness, from the captured image 60 as the projected image 70.

The histogram processing section 230 generates the totals of the numbers of pixels for each scan line, when the projected image 70 is scanned in the horizontal direction, as the histogram 80 of the numbers of pixels in the horizontal direction and the totals of the numbers of pixels for each scan line, when the projected image 70 is scanned in the vertical direction as the histogram 82 of the numbers of pixels in the vertical direction, as shown in FIG. 2.

The histogram processing section 230 also calculates the ratio of an upper-base length a to a lower-base length b from the histogram 80 of the numbers of pixels in the horizontal direction and the sign of a value obtained by subtracting a lower-base length d from an upper-base length c of the histogram 82 of the numbers of pixels in the vertical direction, and transmits them as histogram information to a transmitter section 250.

In this case, the ratio of the upper-base length a to the lower-base length b of the histogram 80 of the numbers of pixels in the horizontal direction represents the magnitude of the distortion. The magnitude of the distortion increases as this ratio increases, by way of example. The sign of the value obtained by subtracting the lower-base length d from the upper-base length c of the histogram 82 of the numbers of pixels in the vertical direction represents the direction of the distortion in either the right or left direction.

The histogram information can therefore be termed information that represents keystone distortion as numerical values.

The remote controller 20 comprises a direction determination section 240 having a direction sensor 242, and the transmitter section 250 that transmits histogram information comprising the histogram 80 of the numbers of pixels in the horizontal direction and the histogram 82 of the numbers of pixels in the vertical direction from the histogram processing section 230 and direction information from the direction determination section 240, to the projector 10.

The direction determination section 240 uses the direction sensor 242 to measure the normal direction $\theta n$ of the optical axis in the direction perpendicular to the projection area 30 from the virtual viewpoint position 50 and the projected image direction $\theta i$ of a central portion of the projected image 70 from the virtual viewpoint position 50, as shown in FIG. 1, and generates direction information that represents an angle $\theta$ obtained by subtracting the projected image direction $\theta i$ from the normal direction $\theta n$ to obtain an angle $\theta$.

The direction information represents the positional relationship between the virtual viewpoint position 50 and the projector 10. If the angle $\theta$ is zero, by way of example, the projector 10 is directly in front of the viewer 40, a positive value of angle $\theta$ indicates that the projector 10 is to the right of the viewer 40, and a negative value of angle $\theta$ indicates that the projector 10 is to the left of the viewer 40.

The description now turns to the flow of image processing using the above components, with reference to a flowchart.

Figure 5:
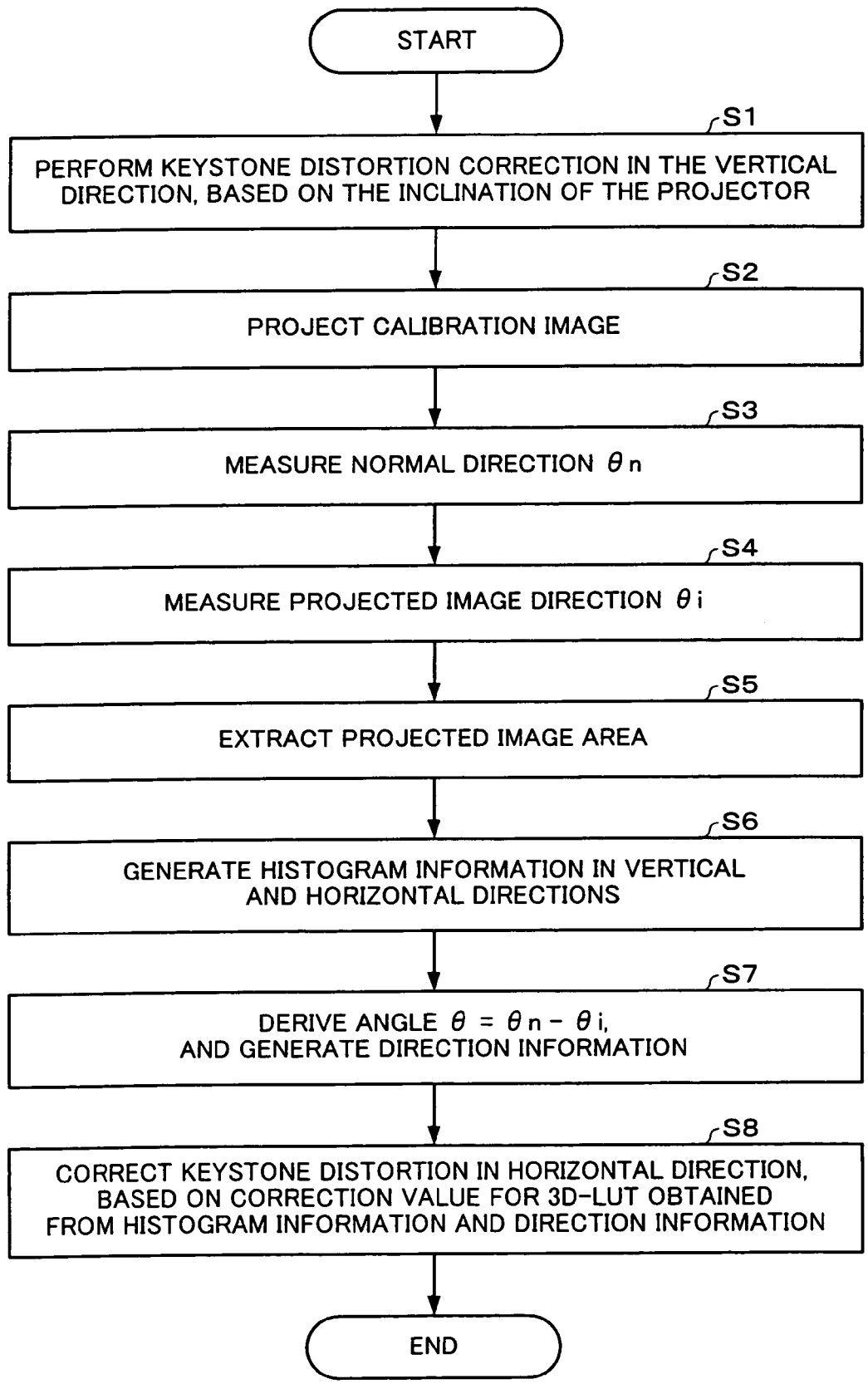
FIG. 5 is a flowchart of keystone distortion correction processing in accordance with the first embodiment of the present invention.

A flowchart of the flow of keystone distortion correction in accordance with this embodiment is shown in FIG. 5.

First of all, the vertical keystone distortion correction section 141 transmits a vertical keystone distortion correction value corresponding to the inclination of the projector 10 in the vertical direction, as detected by the inclination sensor 142, to the resizing section 114. The resizing section 114 resizes the input image signal to perform a keystone distortion correction in the vertical direction (step S1).

The calibration signal generation section 150 generates a calibration signal that causes the display of a completely white maximum grayscale image, and the image projection section 190 projects that (step S2).

The viewer 40 points the remote controller 20 in the direction perpendicular to the projection area 30 and presses a normal direction measurement button on the remote controller 20. In accordance with this action, the direction determination section 240 measures the normal direction $\theta n$ (step S3).

The viewer 40 then points the remote controller 20 toward the vicinity of the center of the projected image 70, which maintaining the horizontal orientation thereof, and presses a keystone distortion correction button. In accordance with this action, the direction determination section 240 measures the projected image direction $\theta i$ (step S4).

Concomitant with these actions, the area sensor section 210 senses the projection area 30 and extracts the area of the projected image 70 from the captured image 60 (step S5).

The histogram processing section 230 generates the histogram 80 of the numbers of pixels in the horizontal direction and the histogram 82 of the numbers of pixels in the vertical direction, based on the projected image 70, derives the above-described a, b, c, and d values, and generates the histogram information (step S6).

The direction determination section 240 derives the angle θ=θn−θi, and generates the direction information (step S7).

The transmitter section 250 of the remote controller 20 transmits the histogram information and direction information to the projector 10. The receiver section 160 of the projector 10 receives the histogram information and direction information from the remote controller 20.

The horizontal keystone distortion correction section 143 sends a horizontal direction keystone distortion correction value, that is based on a correction value from the 3D-LUT 144 corresponding to the histogram information and direction information, to the resizing section 114. The resizing section 114 corrects the keystone distortion in the horizontal direction by correcting the input image signal in such a manner that the keystone distortion in the horizontal direction is corrected thereby, based on that correction value (step S8).

The above-described procedure makes it possible for the image processing system that comprises the remote controller 20 to correct keystone distortion from consideration of the virtual viewpoint position 50, automatically and also appropriately.

Note that the hardware described below could be employed as the hardware of the above-described projector 10.

Figure 6:
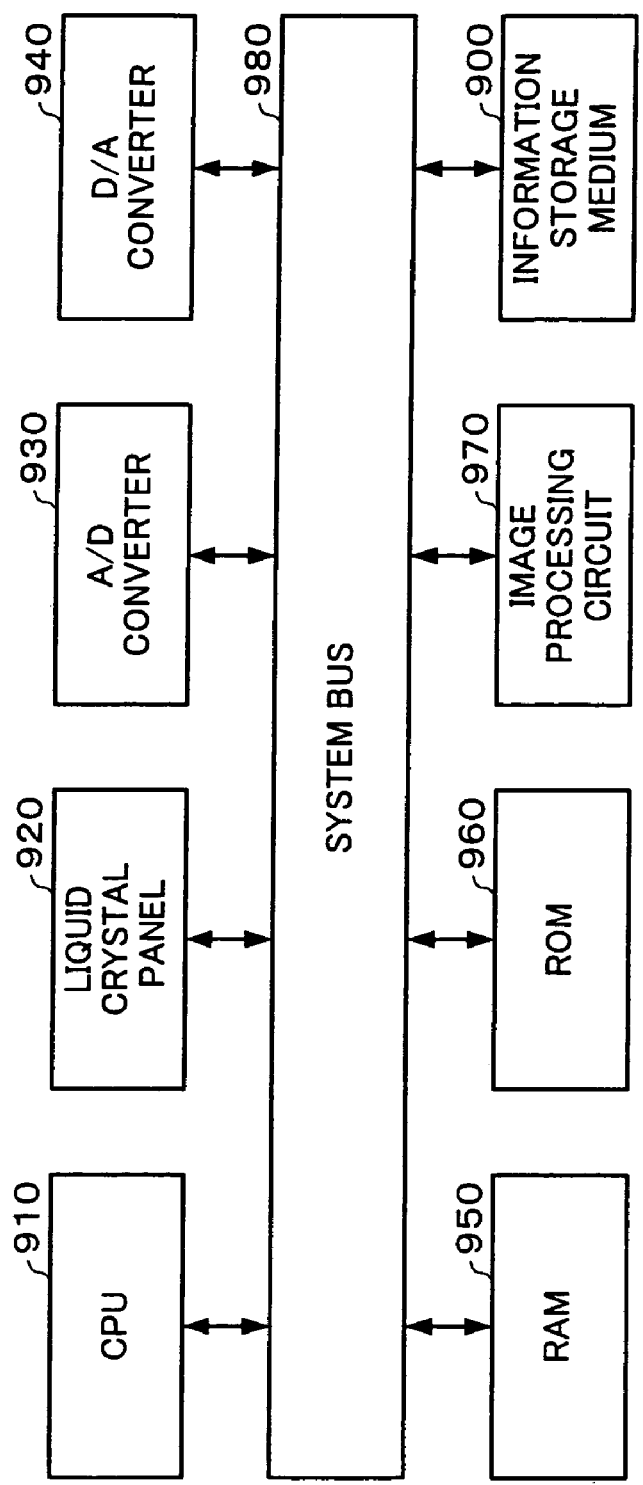
FIG. 6 is a hardware block diagram of the projector in accordance with the first embodiment of the present invention.

A block diagram of the hardware of the projector 10 in accordance with this embodiment is shown in FIG. 6.

For example, the configuration could be implemented by an A/D converter 930 or the like as the A/D converter section 112; an image processing circuit 970, RAM 950, and a CPU 910 or the like as the color conversion section 120 and the keystone distortion correction section 140; a D/A converter 940 or the like as the D/A converter section 132; and a liquid-crystal panel 920 and a ROM 960 in which is stored liquid-crystal light valve drivers for driving the liquid-crystal panel 920 as the spatial light modulator 192.

Note that these components can exchange information between themselves over a system bus 980.

The transfer paths between the projector 10 and the remote controller 20 could be either cables or wireless. Infrared ports or the like could be used for wireless information exchange or input-output ports or the like could be used for wired information exchange, between the receiver section 160 of the projector 10 and the transmitter section 250 of the remote controller 20.

The rest of the hardware of the remote controller 20 could be implemented by using a CCD sensor or the like as the area sensor section 210 and image processing circuitry as the projected image area extraction section 220 and the histogram processing section 230.

In addition, these components could be implemented in a hardware manner by circuitry or in a software manner by drivers.

The keystone distortion correction section 140 could also be implemented by reading from an information storage medium 900 a program that causes a computer to function as the keystone distortion correction section 140, to cause the computer to function as the keystone distortion correction section 140.

The information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to implement the above-described functions.

As described above, this embodiment makes it possible for the image processing system to determine the keystone distortion by sensing from the virtual viewpoint position 50 which is the sensing position. The image processing system can convert the magnitude of the distortion into numerical values by converting the sensing information into the histogram 80 of the numbers of pixels in the horizontal direction and the histogram 82 of the numbers of pixels in the vertical direction. In addition, the image processing system can determine any relative displacement between the sensing direction and the projection direction by determining the angle θ.

The image processing system can also correct not only keystone distortion in the vertical direction, but also keystone distortion in the horizontal direction, both automatically and appropriately, by correcting the keystone distortion based on histogram information that represents the distortion circumstances and direction information that represents the relative displacement between the sensing direction and the projection direction.

The keystone distortion in the horizontal direction varies with the relative positional relationship between the projector 10 and the projection area 30, whereas the keystone distortion in the vertical direction is mainly affected by the inclination of the projector 10.

Since the image processing system can therefore use the inclination sensor 142 provided in the projector 10 to correct keystone distortion in the vertical direction and also use the histogram information that represents the relative positional relationship between the projector 10 and the projection area 30 to correct keystone distortion in the horizontal direction, it can correct keystone distortion in both the vertical direction and the horizontal direction as appropriate.

Second Embodiment

The description now turns to a second embodiment that corrects keystone distortion by projecting a rectangular laser beam from the virtual viewpoint position 50 to the projection area 30 and sensing the projection area 30 from a projection position 52. Note that the virtual viewpoint position 50 in this second embodiment is the position from which the laser beam is projected.

Figure 7:
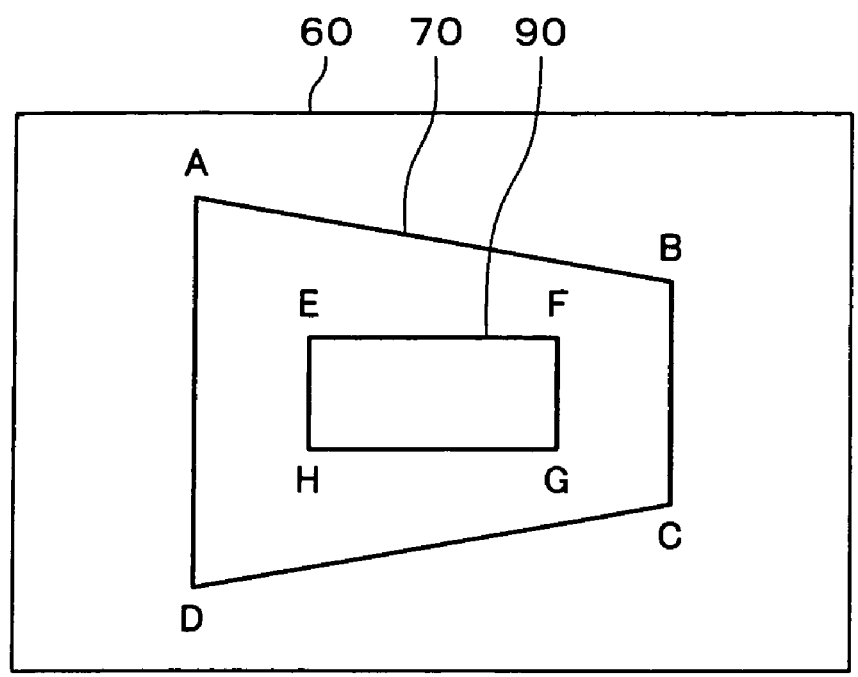
FIG. 7 is a schematic view of a projected image and a laser beam projected image in accordance with a second embodiment of the present invention.

A schematic view of the projected image 70 and a laser beam projected image 90 in accordance with the second embodiment is shown in FIG. 7.

In this embodiment, a laser beam is projected from the remote controller operated by the viewer 40 within the projected image 70, in a rectangular form as seen by the viewer 40.

As a result, the captured image 60 comprises the projected image 70 that is a trapezium ABCD and the laser beam projected image 90 that is a rectangle EFGH within the trapezium ABCD. Note that the laser beam projected image 90 is preferably formed within the projected image 70.

The projected image 70 is reshaped into a rectangle to correct keystone distortion, by associating the coordinates of the four corners of the rectangle EFGH with four conversion coordinates within the spatial light modulator 192 then mapping the coordinates of the input image into those four conversion coordinates.

The description now turns to the functional blocks of the projector 10 and the remote controller for implementing these functions.

Figure 8:
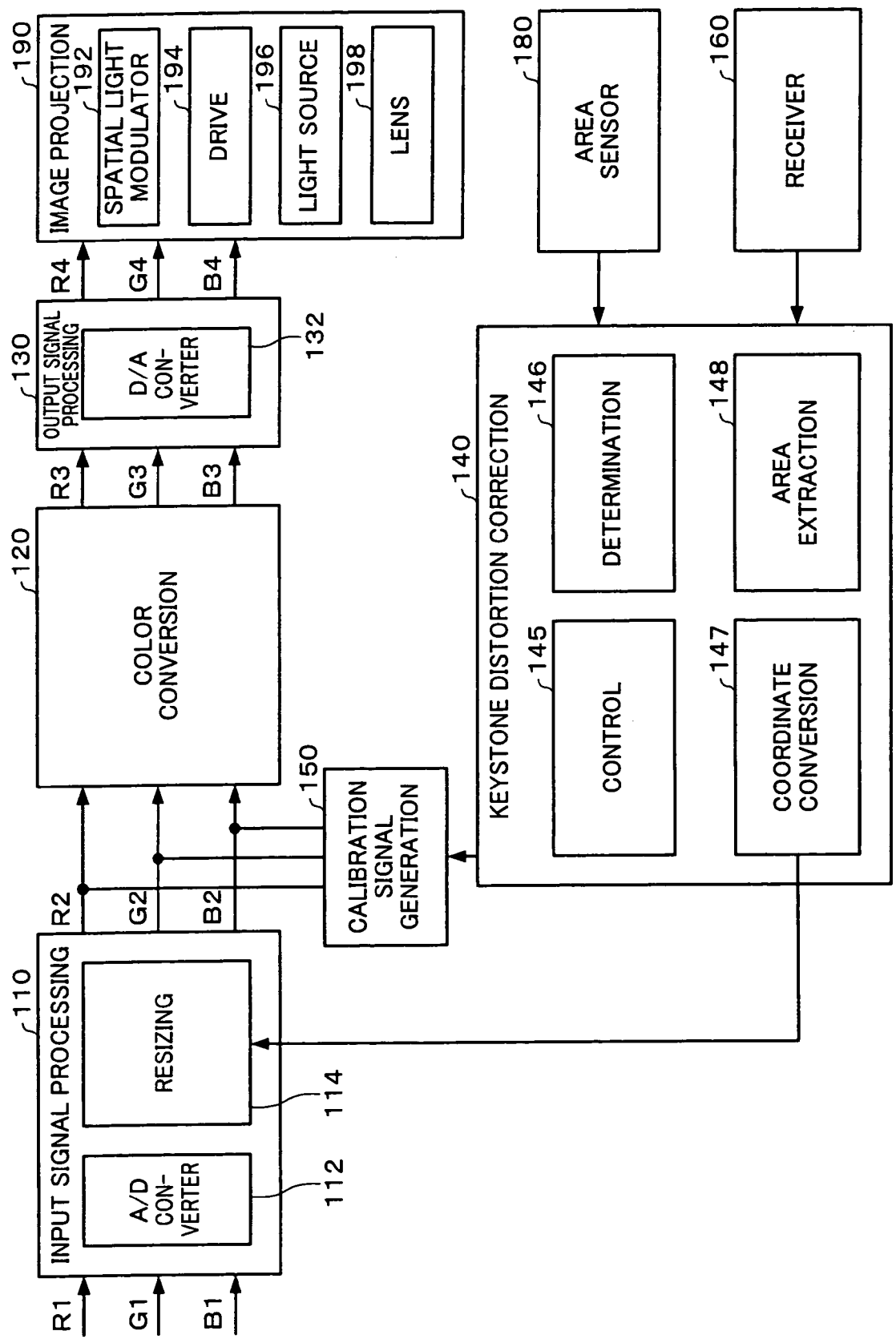
FIG. 8 is a functional block diagram of a projector in accordance with the second embodiment of the present invention.
Figure 9:
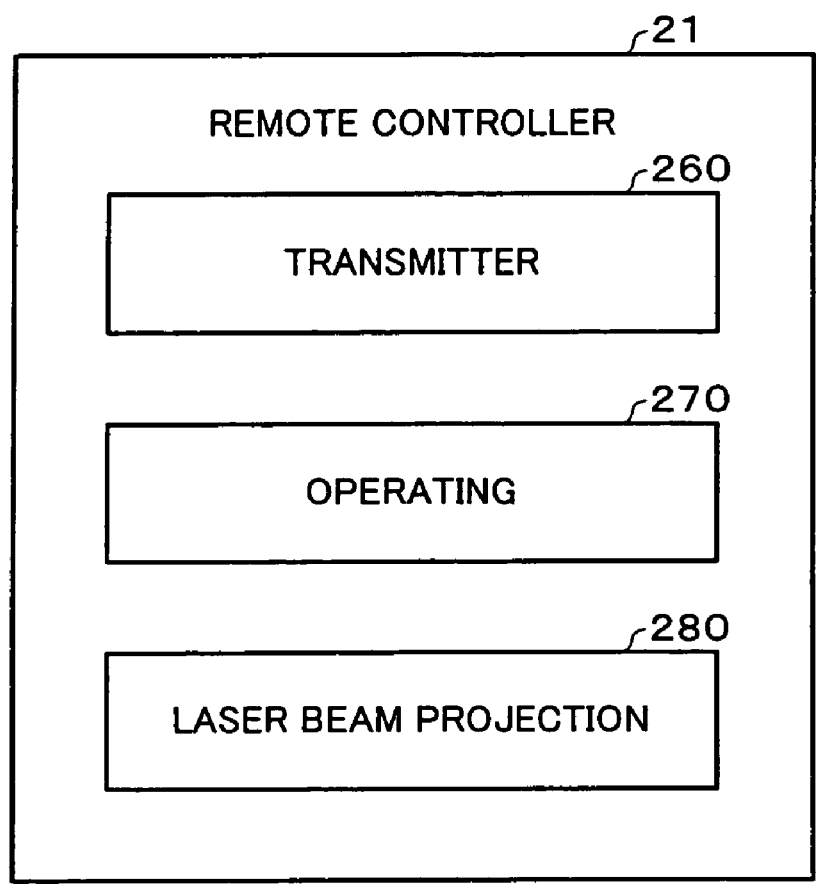
FIG. 9 is a functional block diagram of a remote controller in accordance with the second embodiment of the present invention.

A functional block diagram of the projector 10 in accordance with this embodiment is shown in FIG. 8. A functional block diagram of a remote controller 21 in accordance with this embodiment is shown in FIG. 9.

The remote controller 21 of this embodiment comprises a laser beam projection section 280 that functions as a light projection means, an operating section 270, and a transmitter section 260 that transmits signals such as an operation-start signal to the projector 10.

The projector 10 of this embodiment has a similar configuration to that of the projector 10 of FIG. 3, described as the first embodiment, except that it differs from the projector 10 of FIG. 3 in the functions of the keystone distortion correction section 140 and in the provision of an area sensor section 180 that functions as sensing means.

The keystone distortion correction section 140 of this embodiment comprises a control section 145, a determination section 146, a coordinate conversion section 147, and an area extraction section 148 that extracts the coordinates of the four corners of the projected image 70 in the captured image 60 and the coordinates of the four corners of the laser beam projected image 90 in the captured image 60, based on sensing information.

The area sensor section 180 is provided with the projector 10 of FIG. 1, for sensing the projection area 30 from the projection position 52.

Note that the brightness and color of the projected image 70 differ from the brightness and color of the laser beam projected image 90. It is therefore possible for the area extraction section 148 to distinguish between the laser beam projected image 90 and the projected image 70 within the captured image 60, by demarcating in accordance with brightness or color.

The description now turns to the flow of processing with these components.

Figure 10:
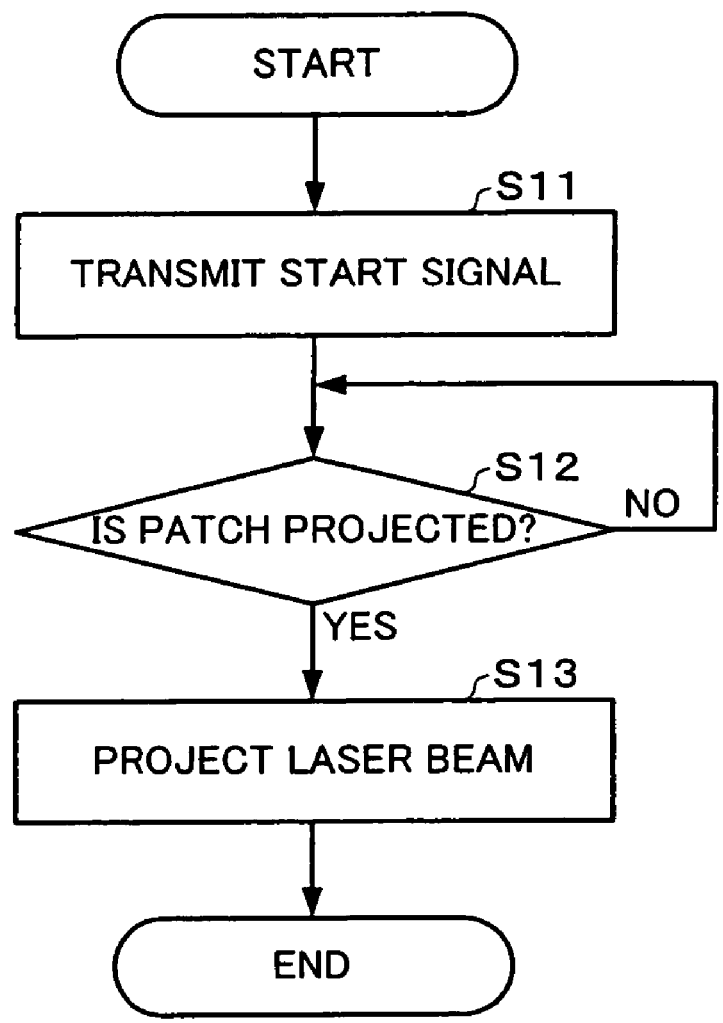
FIG. 10 is a flowchart of the processing by the remote controller in accordance with the second embodiment of the present invention.

A flowchart of the flow of processing by the remote controller 20 in accordance with this embodiment is shown in FIG. 10.

First of all, the description relates to the flow of processing by the remote controller 21.

The viewer faces the projection area 30 and presses a distortion correction button of the remote controller 21. This makes the operating section 270 output a control signal to the transmitter section 260, and the transmitter section 260 transmits a start signal (meaning start the keystone distortion correction) to the projector 10 (step S11).

The viewer 40 presses a projection button of the remote controller 21 when a patch (calibration image) is projected by the projector 10 (step S12). This makes the operating section 270 output a control signal to the laser beam projection section 280 to make it output a laser beam.

The laser beam projection section 280 projects a rectangular laser beam based on the control signal (step S13).

The description now concerns the flow of processing by the projector 10.

Figure 11:
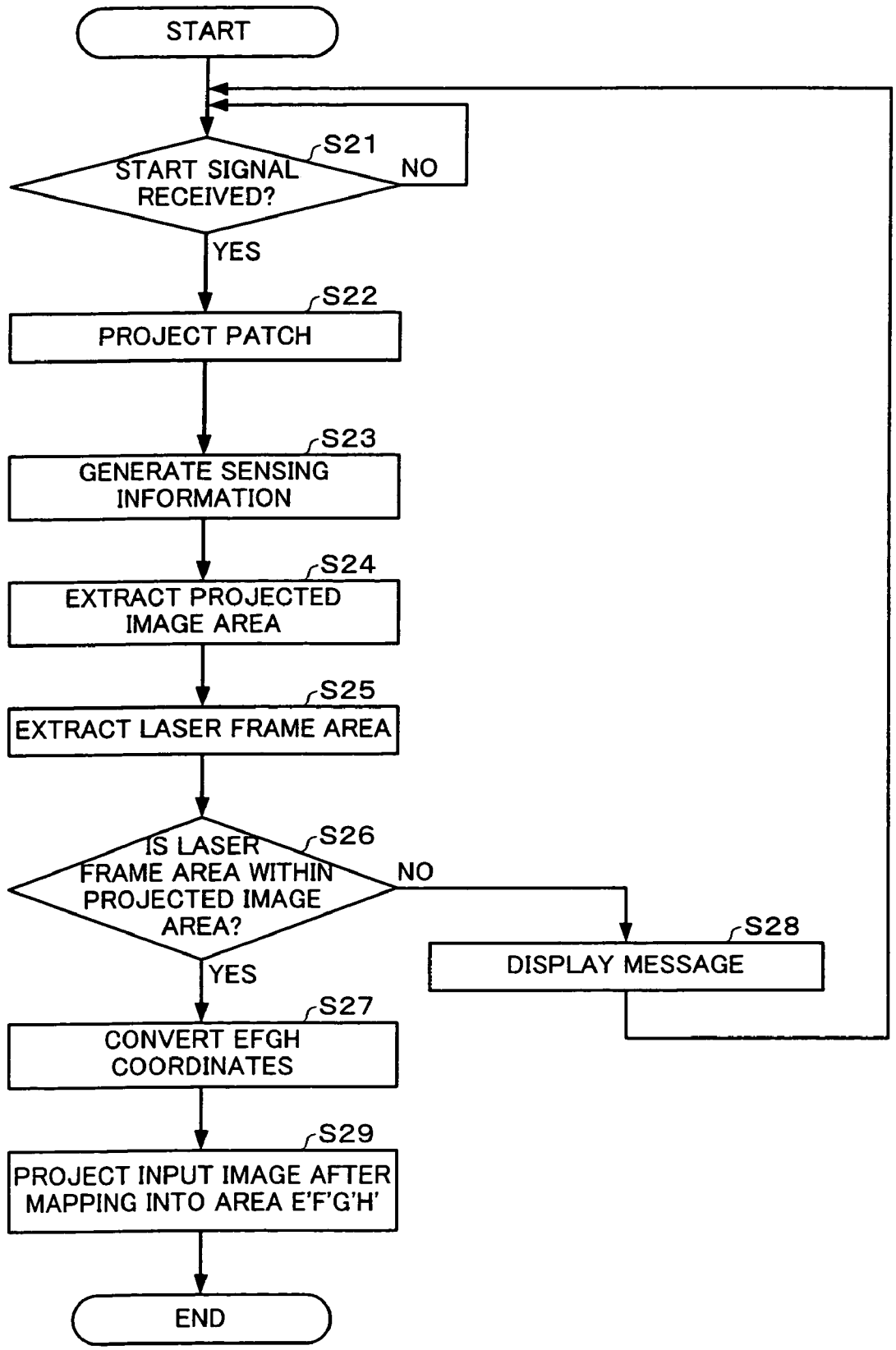
FIG. 11 is a flowchart of the processing by the projector in accordance with the second embodiment of the present invention.

A flowchart of the flow of processing by the projector 10 in accordance with this embodiment is shown in FIG. 11.

The determination section 146 determines whether or not the receiver section 160 has received a keystone distortion correction start signal from the remote controller 21 (step S21).

If it has received the start signal, the image projection section 190 projects a completely-white patch, based on a calibration signal by the calibration signal generation section 150 (step S22).

Note that when the patch is projected, the viewer 40 adjusts the position and direction of the remote controller 21 in such a manner that the laser beam is displayed as a rectangle within the projected image 70 of the patch.

The area sensor section 180 senses the projection area 30 in which the laser beam projected image 90 and the projected image 70 are displayed, and generates sensing information (step S23).

The area extraction section 148 extracts the projected image area (the coordinates of the sensed area defined by the four corners ABCD of the projected image 70) that has brightnesses within the range of the projected light, based on the sensing information (step S24).

Concomitant therewith, the area extraction section 148 extracts the laser frame area (the coordinates of the sensed area defined by the four corners EFGH of the laser beam projected image 90) that has brightnesses within the range of the laser beam, based on the sensing information (step S25).

The determination section 146 determines whether or not the laser frame area is within the projected image area, based on the coordinates extracted by the area extraction section 148 (step S26).

If the laser frame area is within the projected image area, the coordinate conversion section 147 converts the coordinates EFGH of the laser frame area into coordinates E'F'G'H' in the processing system of the spatial light modulator 192 of the image projection section 190 (step S27).

The resizing section 114 maps the input image signal into an area formed by the coordinates E'F'G'H'.

The image projection section 190 projects an image based on the thus-mapped image information (step S29).

Note that if the laser frame area is not within the projected image area, the control section 145 outputs a control signal to the calibration signal generation section 150, so as to cause the projection of a message image prompting the viewer 40 to project the laser frame area into the projected image area.

The calibration signal generation section 150 generates the signal for that message image and the image projection section 190 displays the message based on the signal for that message image (step S28).

In this manner, this embodiment makes it possible to determine the coordinates of a rectangle of light created by light of a rectangular shape projected into the projection area 30 in a state in which there is no distortion when seen from the virtual viewpoint position 50, by sensing from the projection position 52.

In other words, the coordinates of the rectangle of light enable the capture of the coordinates of a distortion-free image, and a distortion-free image can be projected during the projection of images by mapping the coordinates of the input image onto those coordinates.

This makes it possible to correct keystone distortion not only in the vertical direction but also in the horizontal direction, both automatically and appropriately.

In comparison with the first embodiment, there is no need for the 3D-LUT 144, enabling a reduction in necessary storage capacity.

Modifications

The present invention was described above with reference to preferred embodiments thereof but it should be obvious to those skilled in the art that the application of the present invention is not limited to the above-described embodiments.

For example, an input image signal is mapped into a laser frame area in the second embodiment, but it is equally possible to use laser beam information only in the obtaining of distortion information. As an example thereof, it is possible to obtain an image such that keystone distortion is corrected within suitable dimensions (such as the largest possible dimensions), irrespective of the dimensions of the laser frame, by using the system of the second embodiment to project and sense a laser frame, determining distortion of the laser frame of the sensed image by the histogram processing section of the first embodiment (in this case, within the projector 10), and resizing the input image in accordance with the distortion circumstances.

Furthermore, the viewer 40 is assumed to be placed facing the projection area 30 in the second embodiment, but the configuration could be such that the direction determination section 240 of the remote controller 20 of the first embodiment is provided in the remote controller 21 of the second embodiment, and the histogram processing section of the remote controller 20 of the first embodiment and the 3D-LUT of the projector 10 of the first embodiment are provided in the projector 10 of the second embodiment. In addition, the necessity of positioning the viewer 40 facing the projection area 30 can be removed by having the projector 10 determine the direction and laser beam distortion information, to perform keystone distortion correction.

In the second embodiment, the laser beam was described as seeming to be rectangular, by way of example, but it could equally well be another shape such as square or circular.

Furthermore, a laser beam was used in the second embodiment, but any light that can be distinguished from the projected image 70 can be used therefore, such as infrared light.

In the first embodiment, the inclination sensor 142 is used in the correction of the keystone distortion in the vertical direction, but keystone distortion in both the vertical and horizontal directions could be corrected on the basis of the histogram information and direction information alone, without using the inclination sensor 142.

In addition, if the lens 198 and the area sensor section 210 are provided with a zoom function, the projector 10 could correct keystone distortion by obtaining zoom-related information (such as numerical values that express the state at the furthest distance as 0 and the state at the widest angle as 1).

This enables automatic and also appropriate keystone distortion correction when using either the long-distance function or the wide-angle function.

In the first embodiment, the remote controller is used to measure the projected image direction θi in the vicinity of the center of the projected image 70 and sense the projection area 30, in the processing of steps S4 and S5, but the following processing could be used to ensure that the remote controller is directed reliably toward the center of the projected image 70.

In other words, the configuration could be such that the projector 10 displays a predetermined mark (such as an "X") at the center of the projected image 70, the user uses a laser pointing function of the remote controller 20 to press the keystone distortion correction button while superimposing a laser beam on that predetermined mark, and the remote controller 20 measures the projected image direction θi and senses the projection area 30. This makes it possible for the image processing system to direct the remote controller more accurately towards the vicinity of the center of the projected image 70.

In the above-described embodiments, the calibration patch was described as being a completely-white image, but it is not limited to being completely white and thus various other calibration images could be used therefore.

The configuration of the image processing system and the distribution of functions between the projector 10 and the remote controllers 20 and 21 are also not limited to those of the above-described embodiments. The functions of the projected image area extraction section 220 and the histogram processing section 230 of the first embodiment could be provided in the projector 10 of the first embodiment, by way of example. Similarly, the function of the horizontal keystone distortion correction section 143 of the projector 10 of the first embodiment could be provided in the remote controller 20. Furthermore, the function of the keystone distortion correction section 140 of the second embodiment could be provided in the remote controller 21.

In addition, the virtual viewpoint position 50 and the projection position 52 are not limited to those shown in FIG. 1.

In the above-described embodiments, the remote controllers 20 and 21 were used as portable devices, but other portable devices such as handy terminals, PDAs, or mobile phones could equally well be used therefore.

The embodiments described above related to a liquid-crystal projector as the image display device, but they can also be applied to a projector using a digital micromirror device (DMD), by way of example. Note that DMD is a trademark registered to Texas Instruments Inc. of the USA.

Note that the functions of the above-described projector 10 could be implemented by the projector alone, by way of example, or they could be implemented by distributing them between a plurality of processing devices (such as between the projector and a PC).

What is claimed is:

1. An image processing system comprising:
   sensing means for sensing a projection area on which an image is projected and outputting sensing information;
   histogram generation means for generating histogram information that expresses histograms of the numbers of pixels of the sensed image in each of the vertical and horizontal directions, based on the sensing information;
   direction determination means for generating direction information, based on an angle between a normal direction orthogonal to the projection area from a sensing position and a projected image direction toward a central portion of the projected image from the sensing position; and
   keystone distortion correction means for correcting keystone distortion of the projected image, based on the histogram information and the direction information.

2. The image processing system as defined in claim 1, comprising:
   a portable device having the sensing means, the histogram generation means, and the direction determination means; and
   an image display device having the keystone distortion correction means and projection means for projecting an image,
   wherein the keystone distortion correction means includes:
   vertical keystone distortion correction means having inclination detection means for detecting the inclination of the image display device, for correcting keystone distortion in the vertical direction; and
   horizontal keystone distortion correction means for correcting keystone distortion in the horizontal direction, based on the histogram information and the direction information.

3. An image processing system comprising:
   a projection section which projects an image into a projection area;
   light projection means for projecting light of a distortion-free and predetermined shape from a virtual view position into the projection area;
   sensing means for outputting sensing information obtained by sensing the projection area into which the light of the predetermined shape is projected, from a projection position of the projection section;

area extraction means for extracting coordinates of the light of the predetermined shape in a sensed area, based on the sensing information; and keystone distortion correction means for converting the coordinates of the light of the predetermined shape in the sensed area into coordinates for projection in a spatial light modulator of the projection section, and correcting keystone distortion by mapping coordinates of an input image into the projection coordinates.

4. The image processing system as defined in claim 3, wherein:

the predetermined shape is rectangular or square;

the area extraction means extracts coordinates of four corners of the light of the predetermined shape; and the keystone distortion correction means converts the coordinates of the four corners of the light of the predetermined shape in the sensed area into coordinates for projection in a spatial light modulator of the projection section, and corrects keystone distortion by mapping the coordinates of an input image into an area formed by the projection coordinates of the four corners.

5. The image processing system as defined in claim 3, comprising:

a portable device having the light projection means; and an image display device having the sensing means, the keystone distortion correction means, and the projection section.

6. A projector comprising:

projection means for projecting an image;

receiving means for receiving histogram information that expresses histograms of the numbers of pixels of the sensed image in each of the vertical and horizontal directions, based on sensing information obtained by sensing a projection area on which the projected image is projected, and direction information based on an angle between a normal direction orthogonal to a projection area from a sensing position and a projected image direction toward a central portion of the projected image from the sensing position; and keystone distortion correction means for correcting keystone distortion of the projected image, based on the histogram information and the direction information.

7. The projector as defined in claim 6, wherein the keystone distortion correction means includes:

vertical keystone distortion correction means having inclination detection means for detecting the inclination of the projection means, for correcting keystone distortion in the vertical direction; and horizontal keystone distortion correction means for correcting keystone distortion in the horizontal direction, based on the histogram information and the direction information.

8. A projector comprising:

a projection section which projects an image into a projection area;

sensing means for outputting sensing information obtained by sensing a projection area into which light of a distortion-free and predetermined shape is projected from a virtual view position, from a projection position of the projection section;

area extraction means for extracting coordinates of the light of the predetermined shape in a sensed area, based on the sensing information; and keystone distortion correction means for converting the coordinates of the light of the predetermined shape in the sensed area into coordinates for projection in a spatial light modulator of the projection section, and correcting keystone distortion by mapping coordinates of an input image into the projection coordinates.

9. The projector as defined in claim 8, wherein:

the predetermined shape is rectangular or square;

the area extraction means extracts coordinates of four corners of the light of the predetermined shape; and the keystone distortion correction means converts the coordinates of the four corners of the light of the predetermined shape in the sensed area into coordinates for projection in a spatial light modulator of the projection section, and corrects keystone distortion by mapping the coordinates of an input image into an area formed by the projection coordinates of the four corners.

10. A portable device comprising:

sensing means for sensing a projection area on which an image is projected;

histogram generation means for generating histogram information that expresses histograms of the numbers of pixels of the sensed image in each of the vertical and horizontal directions, based on sensing information obtained by the sensing means;

direction determination means for determining direction information based on an angle between a normal direction orthogonal to the projection area from a sensing position and a projected image direction toward a central portion of the projected image from the sensing position; and transmitter means for correcting keystone distortion of the projected image, based on the histogram information and the direction information, and transmitting the histogram information and the direction information to an image display device that projects the projected image.

11. An image processing system comprising:

a sensing section which senses a projection area on which an image is projected and outputting sensing information;

a histogram generation section which generates histogram information that expresses histograms of the numbers of pixels of the sensed image in each of the vertical and horizontal directions, based on the sensing information;

a direction determination section which generates direction information, based on an angle between a normal direction orthogonal to the projection area from a sensing position and a projected image direction toward a central portion of the projected image from the sensing position; and a keystone distortion correction section which corrects keystone distortion of the projected image, based on the histogram information and the direction information.

12. An image processing system comprising:

a projection section which projects an image into a projection area;

a light projection section which projects light of a distortion-free and predetermined shape from a virtual view position into the projection area;

a sensing section which outputs sensing information obtained by sensing the projection area into which the light of the predetermined shape is projected, from a projection position of the projection section;

an area extraction section which extracts coordinates of the light of the predetermined shape in a sensed area, based on the sensing information; and a keystone distortion correction section which converts the coordinates of the light of the predetermined shape in the sensed area into coordinates for projection in a spatial light modulator of the projection section, and correcting keystone distortion by mapping coordinates of an input image into the projection coordinates.

13. A projector comprising:

a projection section which projects an image;

a receiver section which receives histogram information that expresses histograms of the numbers of pixels of the sensed image in each of the vertical and horizontal directions, based on sensing information obtained by sensing a projection area on which the projected image is projected, and direction information based on an angle between a normal direction orthogonal to a projection area from a sensing position and a projected image direction toward a central portion of the projected image from the sensing position; and a keystone distortion correction section which corrects keystone distortion of the projected image, based on the histogram information and the direction information.

14. A projector comprising:

a projection section which projects an image into a projection area;

a sensing section which outputs sensing information obtained by sensing a projection area into which light of a distortion-free and predetermined shape is projected from a virtual view position, from a projection position of the projection section;

an area extraction section which extracts coordinates of the light of the predetermined shape in a sensed area, based on the sensing information; and a keystone distortion correction section which converts the coordinates of the light of the predetermined shape in the sensed area into coordinates for projection in a spatial light modulator of the projection section, and correcting keystone distortion by mapping coordinates of an input image into the projection coordinates.

15. A portable device comprising:

a sensing section which senses a projection area on which an image is projected;

a histogram generation section which generates histogram information that expresses histograms of the numbers of pixels of the sensed image in each of the vertical and horizontal directions, based on sensing information obtained by the sensing section;

a direction determination section which determines direction information based on an angle between a normal direction orthogonal to the projection area from a sensing position and a projected image direction toward a central portion of the projected image from the sensing position; and a transmitter section which corrects keystone distortion of the projected image, based on the histogram information and the direction information, and transmitting the histogram information and the direction information to an image display device that projects the projected image.

16. An image processing method comprising:

sensing a projection area on which an image is projected and outputting sensing information;

generating histogram information that expresses histograms of the numbers of pixels of the sensed image in each of the vertical and horizontal directions, based on the sensing information;

detecting a normal direction orthogonal to the projection area from a sensing position;

detecting a projected image direction toward a central portion of the projected image from the sensing position;

generating direction information, based on an angle between the normal direction and the projected image direction; and correcting keystone distortion of the projected image, based on the histogram information and the direction information.

17. The image processing method as defined in claim 16, comprising:

detecting inclination of an image display device;

correcting keystone distortion in the vertical direction, based on the detected inclination; and correcting keystone distortion in the horizontal direction, based on the histogram information and the direction information.

18. An image processing method comprising:

projecting light of a distortion-free and predetermined shape from a virtual view position into a projection area;

outputting sensing information obtained by sensing the projection area into which the light of the predetermined shape is projected, from a projection position of a projection section for projecting an image;

extracting coordinates of the light of the predetermined shape in a sensed area, based on the sensing information; and converting the coordinates of the light of the predetermined shape in the sensed area into coordinates for projection in a spatial light modulator of the projection section, and correcting keystone distortion by mapping coordinates of an input image into the in the sensed area projection coordinates.

19. The image processing method as defined in claim 18, wherein the predetermined shape is rectangular or square; and the method including:

extracting coordinates of four corners of the light of the predetermined shape when coordinates of the light of the predetermined shape in the sensed area are extracted; and converting the coordinates of the four corners of the light of the predetermined shape in the sensed area into coordinates for projection in the spatial light modulator of the projection section, and correcting keystone distortion by mapping coordinates of an input image into an area formed by the projection coordinates of the four corners, when the keystone distortion is corrected.

* * * * *